US 12,455,347 B2

(12) United States Patent
Statnikov

(10) Patent No.: US 12,455,347 B2
(45) Date of Patent: Oct. 28, 2025

(54) METHOD AND SYSTEM FOR ESTIMATING A RADAR CALIBRATION MATRIX

(71) Applicant: Aptiv Technologies AG, Schaffhausen (CH)

(72) Inventor: Konstantin Statnikov, Düsseldorf (DE)

(73) Assignee: Aptiv Technologies AG, Schaffhausen (CH)

( * ) Notice: Subject to any disclaimer, the term of this patent is extended or adjusted under 35 U.S.C. 154(b) by 448 days.

(21) Appl. No.: 18/059,576

(22) Filed: Nov. 29, 2022

(65) Prior Publication Data

US 2023/0168341 A1    Jun. 1, 2023

(30) Foreign Application Priority Data

Nov. 30, 2021    (EP) .................................. 21211323

(51) Int. Cl.
*G01S 7/40* (2006.01)
*G01S 13/931* (2020.01)

(52) U.S. Cl.
CPC .............. *G01S 7/40* (2013.01); *G01S 13/931* (2013.01)

(58) Field of Classification Search
CPC ................................. G01S 7/40; G01S 13/931
USPC ........................................................ 342/174
See application file for complete search history.

(56) References Cited

U.S. PATENT DOCUMENTS

| | | | | |
|---|---|---|---|---|
| 9,404,371 B1* | 8/2016 | McDonald | .............. | F01D 5/147 |
| 10,591,584 B2* | 3/2020 | Bialer | .................. | G01S 7/4004 |
| 10,670,624 B2* | 6/2020 | Anderson | ............... | G01P 21/00 |
| 10,830,869 B2 | 11/2020 | Raphaeli et al. | | |
| 10,833,781 B2* | 11/2020 | Garcia | .................... | H04B 17/12 |
| 11,448,746 B2* | 9/2022 | Stachnik | ............... | G01S 7/2921 |
| 11,650,305 B2* | 5/2023 | Marsch | ................. | G01S 13/931 |
| | | | | 342/70 |
| 11,982,732 B2* | 5/2024 | Choi | ....................... | G01S 7/354 |
| 2015/0070207 A1* | 3/2015 | Millar | ................. | G01S 13/4454 |
| | | | | 342/174 |
| 2018/0113195 A1* | 4/2018 | Bialer | ..................... | G01S 13/86 |
| 2019/0353751 A1* | 11/2019 | Raphaeli | ................ | G01S 7/292 |

(Continued)

FOREIGN PATENT DOCUMENTS

| | | |
|---|---|---|
| CN | 102544755 | 12/2013 |
| EP | 3144696 | 3/2017 |

(Continued)

OTHER PUBLICATIONS

"Extended European Search Report", EP Application No. 20202060.8, Mar. 22, 2021, 8 pages.

(Continued)

*Primary Examiner* — Nuzhat Pervin
(74) *Attorney, Agent, or Firm* — Harness, Dickey & Pierce, P.L.C.

(57) ABSTRACT

The present disclosure relates to a method and a system for estimating a radar calibration matrix. According to the method, an initial calibration matrix is received, and via a radar sensor, radar detections are acquired from the external environment of the radar sensor. A plurality of beam vectors is determined which are derived from the radar detections, and a correction matrix is estimated based on the plurality of beam vectors. The initial calibration matrix and the correction matrix are combined in order to estimate a refined radar calibration matrix which is utilized as calibration matrix when applying the radar sensor.

14 Claims, 8 Drawing Sheets

(56) References Cited

U.S. PATENT DOCUMENTS

| | | | |
|---|---|---|---|
| 2019/0353780 A1* | 11/2019 | Statnikov | G01S 13/931 |
| 2019/0369222 A1* | 12/2019 | Oh | G01S 13/931 |
| 2020/0033445 A1* | 1/2020 | Raphaeli | G01S 7/4026 |
| 2020/0064441 A1* | 2/2020 | Alcalde | G01S 13/58 |
| 2021/0278511 A1* | 9/2021 | Krishnan | G01S 7/4026 |
| 2021/0341599 A1* | 11/2021 | Rozewicz | G01S 13/931 |
| 2021/0382165 A1* | 12/2021 | Choi | G01S 7/354 |
| 2022/0035000 A1* | 2/2022 | Søndergaard | G01S 13/72 |
| 2022/0113376 A1* | 4/2022 | Zechner | G01S 7/403 |
| 2022/0120854 A1* | 4/2022 | Statnikov | G01S 7/40 |
| 2022/0239530 A1* | 7/2022 | Wagner | H04L 25/0224 |
| 2022/0268887 A1* | 8/2022 | van Meurs | G01S 7/4026 |
| 2023/0105684 A1* | 4/2023 | Brisken | G01S 13/32 342/146 |
| 2023/0105733 A1* | 4/2023 | Statnikov | G01S 13/42 342/174 |
| 2023/0204720 A1* | 6/2023 | Søndergaard | G06T 7/292 342/165 |
| 2023/0375690 A1* | 11/2023 | Arkind | G01S 13/931 |

FOREIGN PATENT DOCUMENTS

| | | |
|---|---|---|
| EP | 3279683 | 2/2018 |
| EP | 3318889 | 5/2018 |
| EP | 3454081 | 3/2019 |

OTHER PUBLICATIONS

"Extended European Search Report", EP Application No. 21211323.7, May 9, 2022, 8 pages.

"Non-Final Office Action", U.S. Appl. No. 17/502,000, Oct. 6, 2023, 6 pages.

* cited by examiner

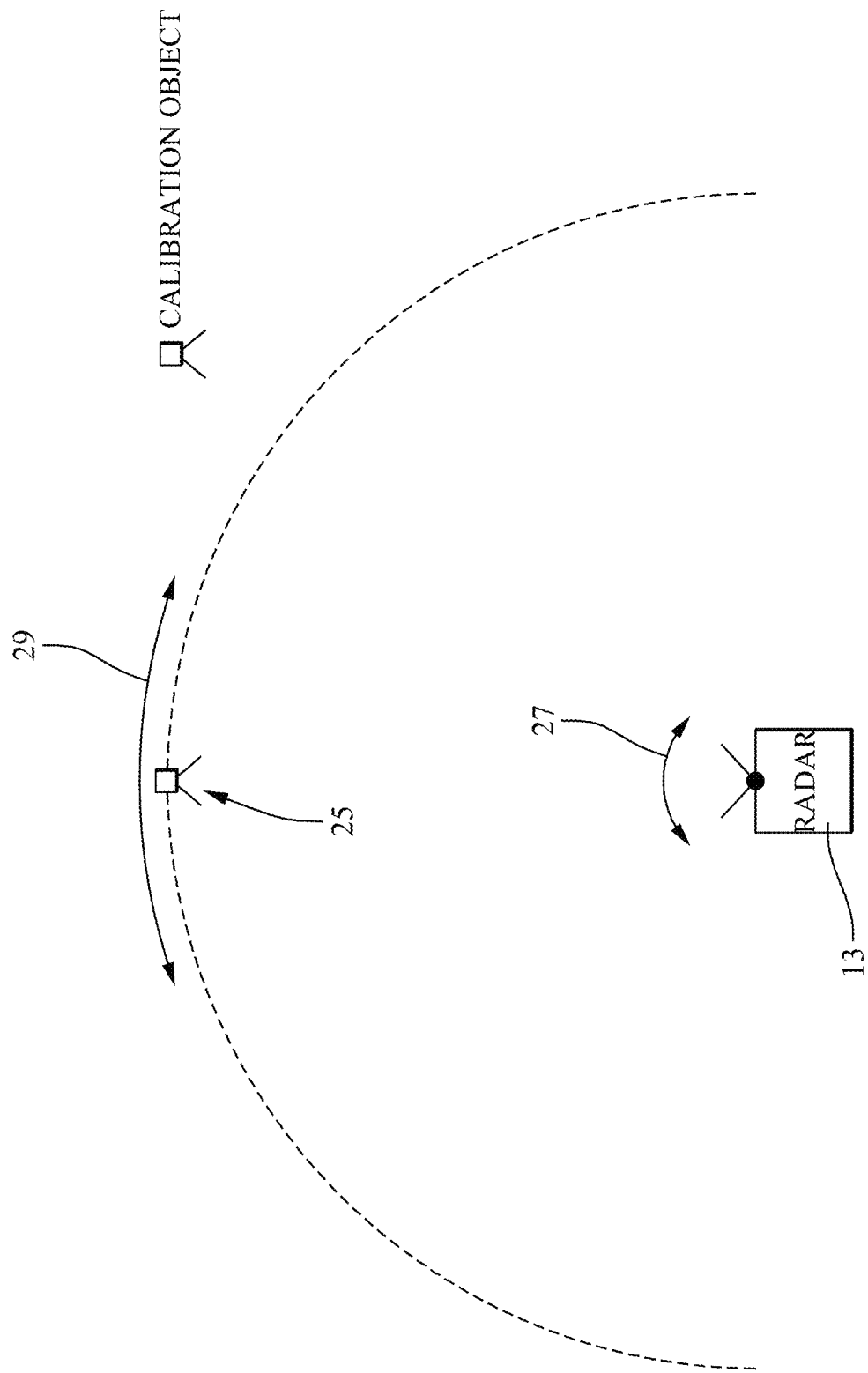

METHOD AND SYSTEM FOR ESTIMATING A RADAR CALIBRATION MATRIX

INCORPORATION BY REFERENCE

This application claims priority to European Patent Application Number EP21211323.7, filed on Nov. 30, 2021, the disclosure of which is incorporated by reference in its entirety.

BACKGROUND

Radar sensors are typically used in modern vehicles for driver assistant systems and to facilitate autonomous driving. In addition to range and Doppler measurements regarding objects located in the environment of the vehicle, angle finding (AF) for such objects is an important step in radar signal processing. In order to accomplish these measurements properly, radar sensors need to be calibrated. Usually, a so-called calibration matrix is estimated which is used to calibrate any raw response of the radar sensor e.g. for the subsequent angle finding.

An offline radar sensor calibration may further be performed in an anechoic chamber. However, such an offline-calibration is time-consuming Generally, the radar sensor to be calibrated has to be placed at a so-called "far-field distance" with respect to a calibration target, which requests a certain size of the anechoic chamber. Furthermore, after being mounted in a vehicle, e.g. beyond a fascia, and being surrounded by further parts of the vehicle, the characteristics of the radar sensor can be affected such that the results of the offline-calibration may not be reliable anymore for the radar sensor mounted in the vehicle.

Furthermore, estimating the calibration matrix may rely on a "block" approach, e.g. on a matrix inversion or on a singular value decomposition (SVD), which are typically applied for the calculation of the calibration matrix as a linear transformation matrix. However, such a block approach cannot be divided into small computational subtasks in order to be suitable for a so-called online calibration, i.e. a calibration based on radar detections after installing the radar sensor in its intended environment, e.g. in a vehicle where computational power is limited. Therefore, an iterative estimation method for the radar calibration matrix has been developed which is called "rank-1 update method" (as described below in detail) and which is based on individual beam vectors provided by radar detections. Although this iterative approach has a low complexity, it tends to be unstable and to provide a slow or even no convergence.

Accordingly, there is a need to provide methods for reliably estimating a radar calibration matrix being suitable for embedded systems with low computational effort.

SUMMARY

The present disclosure provides a computer implemented method, a computer system, and a non-transitory computer readable medium according to the independent claims. Embodiments are given in the subclaims, the description and the drawings.

In one aspect, the present disclosure is directed at a computer implemented method for estimating a radar calibration matrix, the method comprising the following steps performed (in other words: carried out) by computer hardware components: receiving an initial calibration matrix, acquiring, via a radar sensor, radar detections from the external environment of the radar sensor, determining a plurality of beam vectors which are derived from the radar detections, estimating a correction matrix based on the plurality of beam vectors, and combining the initial calibration matrix and the correction matrix in order to estimate a refined radar calibration matrix which is utilized as calibration matrix when applying the radar sensor.

A starting point for the method is the initial calibration matrix which may be determined, for example, via a single measurement at a predefined azimuth angle with respect to the radar sensor, e.g. at zero degrees. In order to determine an initial calibration matrix, a partial calibration, e.g. from factory based on a measurement in a chamber, may be utilized. For example, a single measurement with a single calibration target being placed at a known angle would be sufficient to calculate a diagonal initial calibration matrix.

The radar sensor may be installed in a vehicle. In this case, the radar sensor may be configured to monitor the environment of the vehicle. The correction matrix is estimated, for example, based on beam vectors representing all available radar detections at a certain point in time, e.g. based on an online-measurement if the radar sensor is installed in a vehicle. Thereafter, the initial calibration matrix is modified by the correction matrix. Furthermore, combining the initial calibration matrix and the correction matrix may include that the initial calibration matrix and the correction matrix are added.

The plurality of beam vectors may include that the number of beam vectors derived from the radar detections may be at least as large as the number of antennas or detecting elements of the radar sensor. In addition, each of the plurality of beam vectors may be derived for a different azimuth angle. That is, the plurality of beam vectors may include one single beam vector for each of a plurality of azimuth angles. The respective azimuth angle may be defined with respect to a boresight direction of the radar sensor.

A number of the antenna elements may be assigned to the radar sensor which may not only represent a number of "real" physical antennas belonging to the radar sensor, but also a number of virtual antennas for which the respective beam vectors may be defined. Generally, the components of the beam vector are based on a Fourier transform of the radar detections as raw data received by the respective real or virtual antennas.

For estimating the calibration matrix, a system of equations may generally be solved e.g. by using well-known mathematical approaches (e.g. by using a least-squares estimation). Since the method according to the disclosure relies on estimating a correction matrix instead of e.g. a matrix inversion or a singular value decomposition, the method may be iterative and can be split into subtasks with reduced computational effort.

Moreover, using a plurality of beam vectors for estimating the correction matrix increases the robustness and reliability of the method in comparison to the known (simple) "rank-1 update method" for which the correction matrix is estimated based on a single beam vector only. If the steps of the method according to the disclosure are performed iteratively, an excellent convergence may be achieved in contrast to the simple rank-1 update method. Moreover, the calibration accuracy achieved by the method according to the disclosure is comparable or even better in comparison to applying the known methods which are based e.g. on matrix-inversion or on singular value decomposition (SVD) and which, however, require a higher computational effort.

According to an embodiment, a respective adjustment matrix may be estimated based on one of the beam vectors, and the correction matrix may be estimated by calculating an average over the adjustment matrices of the beam vectors. In other words, the adjustment matrix is estimated for each of the beam vectors in a similar manner as for the known rank-1 update method first, and thereafter an average over all of these adjustment matrices is estimated in order to provide the correction matrix.

Due to this, the estimation procedure for the respective adjustment matrices may be parallelized. Hence, the method may still have a low computational complexity and require a similar low computational effort as the known rank-1 update method. Furthermore, calculating the average of the adjustment matrices may further stabilize the estimation procedure, especially if it is performed iteratively.

For calculating the average, a subset of the available beam vectors may be selected such that the selected beam vectors may be linearly independent. A number of beam vectors in the subset may be equal to or greater than a number of antenna array elements of the radar sensor. The antenna array elements may be real array elements or virtual array elements. In the latter case, the number of the antenna array elements may be greater than the number of antenna array elements which are actually existing in the radar sensor.

By selecting a subset of beam vectors for calculating the average, the computational effort for the method may be reduced. However, linear independence of the selected beam vectors is a condition for the selection in order not to deteriorate the stability when estimating the correction matrix. Setting the minimum number of beam vectors to the number of real or virtual antenna array elements may be a suitable condition for performing the method reliably.

According to a further embodiment, the plurality of beam vectors may cover a predetermined range of azimuth angles with respect to the radar sensor. As mentioned above, the azimuth angle may be defined with respect to a boresight direction of the radar sensor. In this case, the plurality of beam vectors may be referred to as an angle dependent raw array manifold since it smoothly covers a certain range of the azimuth angle.

Moreover, a full angle range being available for the radar sensor may be covered by the plurality of beam vectors, e.g. in the form of equidistant angle intervals or bins. Such an angle range may run from −45 to +45 degrees, or even from −90 degrees to +90 degrees. By covering a large angle range via the plurality of beam vectors, the reliability of the method may be further improved.

A grid having equidistant nodes may be defined for an electric angle which is related to the azimuth angle, and each of the plurality of beam vectors may be assigned to one of the equidistant nodes of the grid for the electric angle. The electric angle may also be denoted as a spatial frequency and may be given as the sine of the azimuth angle, e.g. with respect to the boresight direction of the radar sensor. Relating the plurality of beam vectors to the equidistant grid for the electric angle instead of the azimuth angle directly may further improve the accuracy of the method.

The respective azimuth angle may further be determined for each of the beam vectors based on a range rate which is estimated from the radar detections. That is, a ground truth for the azimuth angles of the respective beam vectors may be derived from the radar detections directly. Hence, no full angle finding procedure may be required for relating the beam vectors to the respective azimuth angles. The term range rate refers to a radial velocity e.g. of a detected object with respect to the radar sensor.

According to a further embodiment, the steps of estimating a correction matrix and of combining the initial calibration matrix and the correction matrix may be performed iteratively until a deviation between the refined calibration matrix and a previous refined calibration matrix being estimated in an immediately preceding iteration step is smaller than a predefined value. That is, the refined calibration matrix which is estimated in a specific iteration step may be used as the initial calibration matrix for the next iteration step.

The iterative estimation of the correction matrix and its repeated combination with the respective previous calibration matrix may lead to an improved convergence and may therefore improve the calibration accuracy. Convergence and calibration accuracy may be further enhanced if, in addition, an average over adjustment matrices over single beam vectors may be used for estimating the respective correction matrix in each iteration step.

The initial calibration matrix which may be the first calibration matrix used in the iterative estimation may be determined via a measurement, e.g. in a calibration chamber and/or at an azimuth angle of zero degrees and at an elevation angle of zero degrees. For example, the measurement may include a single measurement at a predefined azimuth and/or elevation angle. As such, the initial calibration matrix may include diagonal elements only, thereby reducing the computational effort in comparison to the full calibration methods according to the related art performed in the calibration chamber over the full range of azimuth angles. Moreover, the initial calibration matrix may be stored in a database of the vehicle in which the radar sensor may be installed.

According to a further embodiment, a range or distance may be determined with respect to the radar sensor for each of the plurality of radar detections. For determining the plurality of beam vectors, each of the plurality of radar detections may be used only if the range or distance of this detection, i.e. of the respective detection under consideration, is greater than a predetermined range or distance. Hence, detections from far-field target objects may be selected only for determining the beam vectors since the detections are filtered by range for this embodiment.

For each of the plurality of radar detections, it may be determined whether the respective radar detection is related to a single scattering center, and as such radar detections may be disregarded for which it is determined that they are not related to a single scattering center. Therefore, determining the plurality of beam vectors may be linked to those detections which originate from single scattering centers. As a result, the plurality of beam vectors may be unaffected by multiple scattering of transmitted radar waves which may improve the reliability of the calibration.

In another aspect, the present disclosure is directed at a computer system, said computer system comprising a plurality of computer hardware components configured to carry out several or all steps of the computer implemented method described herein.

The computer system may comprise a plurality of computer hardware components (for example a processor, for example processing unit or processing network, at least one memory, for example memory unit or memory network, and at least one non-transitory data storage). It will be understood that further computer hardware components may be provided and used for carrying out steps of the computer implemented method in the computer system. The non-transitory data storage and/or the memory unit may comprise a computer program for instructing the computer to perform several or all steps or aspects of the computer implemented method described herein, for example using the processing unit and the at least one memory unit.

According to another aspect, the computer system further comprises a radar sensor configured to acquire the plurality of radar detections.

In another aspect, the present disclosure is directed at a vehicle comprising the computer system as described herein.

As used herein, the terms processing device and processing unit may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The processing device and the processing unit may include memory (shared, dedicated, or group) that stores code executed by the processor.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM); a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

BRIEF DESCRIPTION OF THE DRAWINGS

Illustrative embodiments and functions of the present disclosure are described herein in conjunction with the following drawings, showing schematically:

FIG. 2 illustrates a calibration procedure for a radar sensor according to the related art.

DETAILED DESCRIPTION

Figure 1:
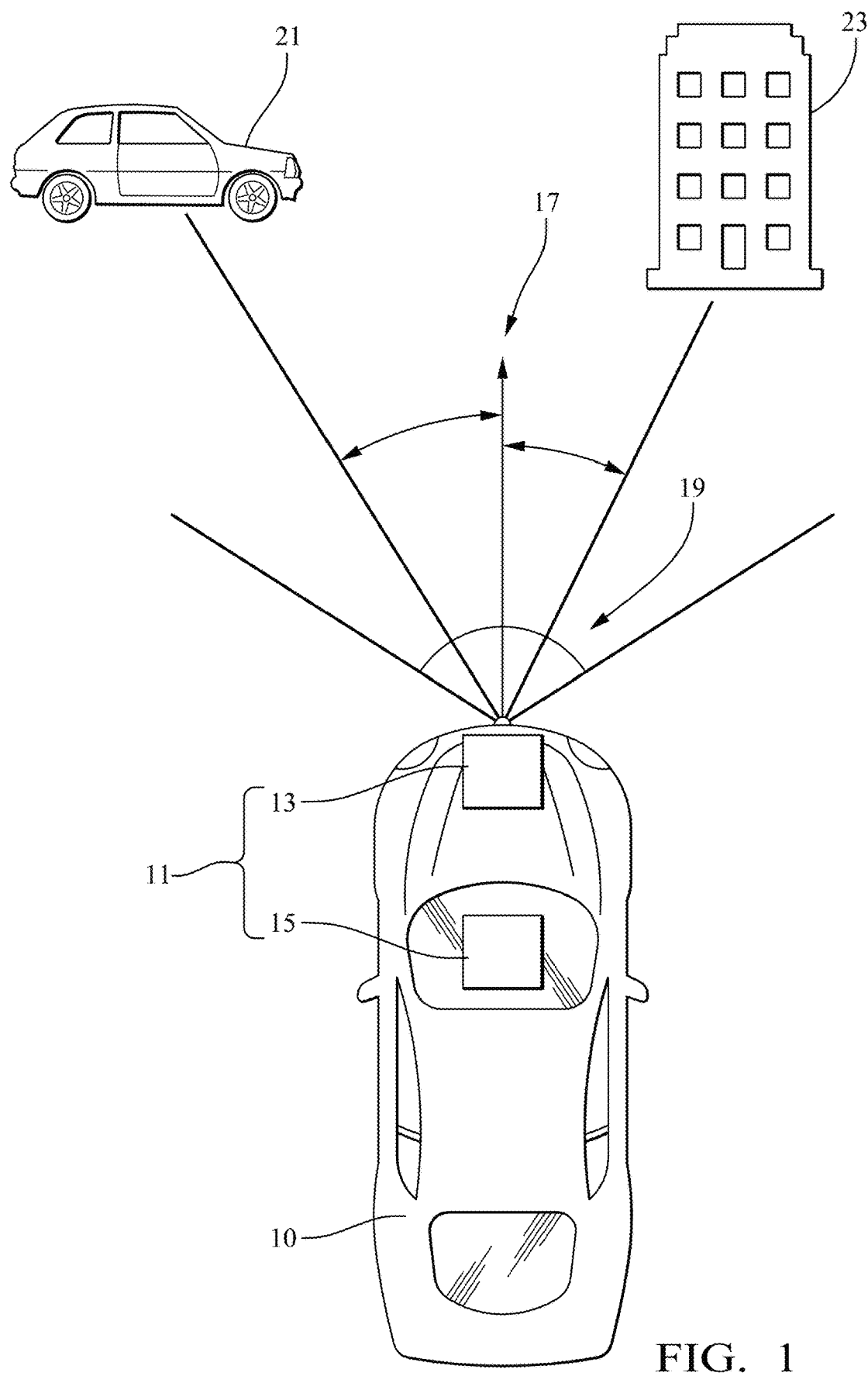
FIG. 1 illustrates an example vehicle including a computer system for performing a method according to the disclosure.

The present disclosure relates to a method and a system for estimating a radar calibration matrix. FIG. 1 depicts a vehicle 10 including a computer system 11 for carrying out a method for estimating a calibration matrix for a radar sensor 13. The computer system 11 includes the radar sensor 13 and a processing unit 15 which is connected to the radar sensor 13 and configured to receive radar detections and to analyze these radar detections according to the steps of the method.

With respect to the radar sensor 13, a boresight direction 17 is defined. The radar sensor 13 includes an instrumental field of view 19 which is defined by the spatial angle for which the radar sensor 13 is able to monitor its external environment, i.e. the environment of the vehicle 10.

The radar sensor 13 is configured to transmit radar waves and to provide radar detections which originate from radar waves being reflected by target objects 21, 23. The target objects 21, 23 include moving objects 21, like other vehicles, and stationary objects 23, like buildings etc. Furthermore, the target objects 21, 23 can either be regarded as single scattering centers or as non-single scattering centers. For each of the target objects 21, 23, a respective angle of arrival or azimuth angle $\theta_1$, $\theta_2$ is defined with respect to the boresight direction 19 of the radar sensor 13. The angles of arrival $\theta_1, \theta_2$ can be determined based on the radar detections, e.g. by angle finding from range rate (or from the Doppler frequency shift), as is known in the art.

In order to provide proper results, e.g. for range, range rate and azimuth angle of the target object 21, 23, the radar sensor 13 has to be calibrated. FIG. 2 depicts a calibration procedure according to the related art which is performed e.g. in an anechoic chamber. That is, an offline-calibration is usually applied to the radar sensor 13 which uses a calibration object or dedicated target 25. The calibration object 25 needs to be placed at a so-called "far-field distance" with respect to the radar sensor 13. Therefore, the anechoic chamber must have a certain size to fulfil this requirement of placing the calibration object 25 at the far-field distance.

During the offline-calibration procedure, measurements, i.e. radar detections, are required at equally spaced angles between the boresight direction 17 of the radar sensor 13 and the calibration object 25. Hence, either the calibration object 25 is moved with respect to the radar sensor 13 on a circle, i.e. at a constant distance, as indicated by the arrow 27. Alternatively, the radar sensor 13 may be rotated with respect to the calibration object 25, as indicated by the arrow 29. In both cases, the movement of the calibration object 25 or the rotation of the radar sensor 13 has to be accomplished such that the entire field of view 19 (see FIG. 1) of the radar sensor 13 is covered in steps of equally spaced angles.

The offline-calibration as shown in FIG. 2 implicitly provides an equal or uniform weighting for the radar detections with respect to the azimuth angle. Therefore, a respective equation can be established for each sampling angle. This leads to a system of equations which may be solved using well-known mathematical approaches (e.g. a least-squares estimation) in order to calculate the calibration matrix C of the radar sensor 13.

However, after the radar sensor 13 is mounted at a vehicle (e.g. beyond a fascia of the vehicle 10, see FIG. 1) and is therefore surrounded by other components of the vehicle, antenna array characteristics of the radar sensor 13 might be affected and altered with respect to the offline-conditions for which the calibration has been performed in the anechoic chamber. Due to this, the calibration result might not be fully reliable after mounting the radar sensor 13 a vehicle. In addition, the offline-calibration of the radar sensor 13 performed in the anechoic chamber is costly and time-consuming.

In order to overcome the drawbacks of the offline-calibration, an online-calibration may be performed which is based on radar reflections from a "scene" in the environment of the vehicle 10 and the radar sensor 13 (see FIG. 1). For such an online-calibration, radar detections are selected which originate at "far-field" target objects 21, 23. From the radar detections, a range or distance can be derived for each of the target objects 21, 23, and for the online-calibration such target objects 21, 23 are selected for which the respective range is greater than a predetermined range. That is, the available radar reflections can be easily filtered with respect to the range, and conversely, radar detections are disregarded for which the corresponding objects 21, 23 are located too close to the vehicle 10 and to the radar sensor 13 since their range with respect to the radar sensor 13 is smaller than the predetermined range.

Furthermore, a single-scatterer test may be performed for the radar detections. That is, for each of the plurality of radar detections from the "scene" around the radar sensor 13, it is determined whether the respective radar detection is related to a single scattering center. The single-scatterer test is known in the art and described e.g. in EP 3454081 A1 or EP 3144696 A1. If it is determined that radar detections are not related to a single scattering center, the respective radar detections are disregarded from the online-calibration.

The result of a radar calibration is usually represented by a radar calibration matrix C which satisfies the following equation:

$$CX = A(\hat{\theta})\hat{Z}$$

$$C = A(\hat{\theta})\hat{Z}X^+ \quad (1)$$

Figure 3A:
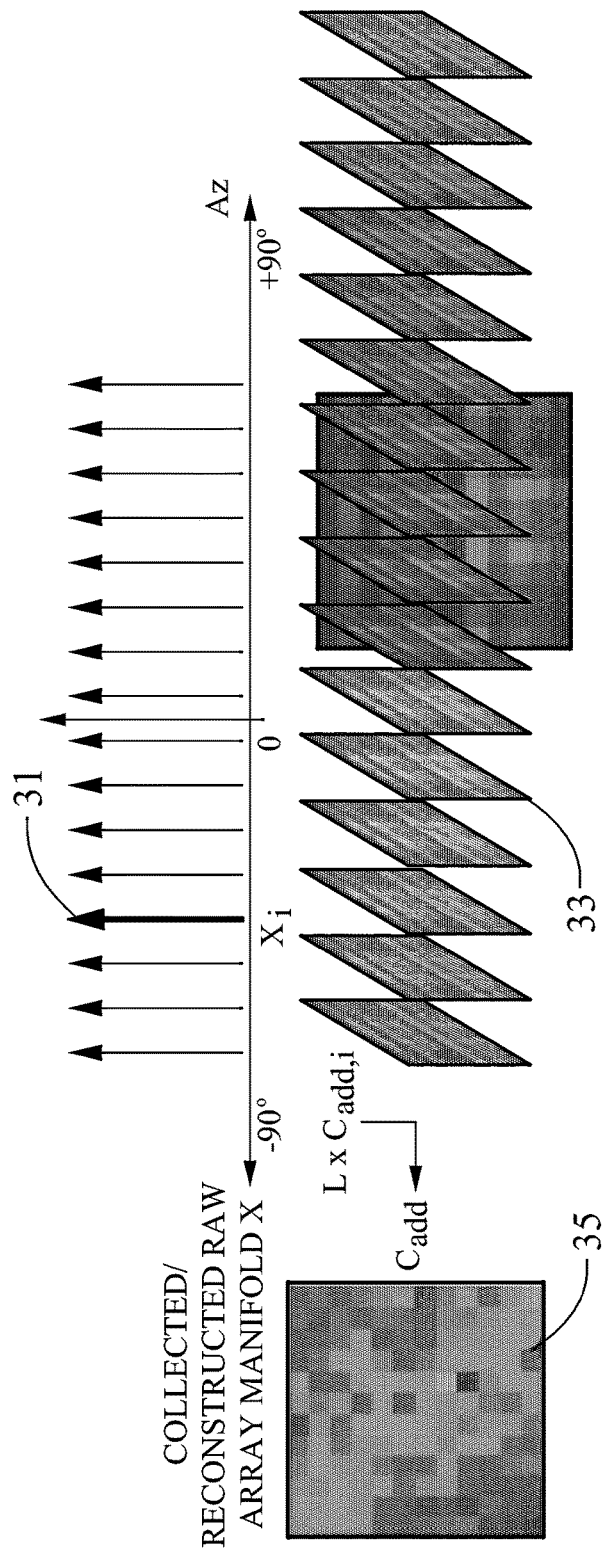
FIGS. 3A and 3B show an illustration of steps for estimating a radar calibration matrix.

X is a raw array manifold which includes a plurality of beam vectors and which is assumed to be available for determining the radar calibration matrix. That is, a plurality of beam vectors $x_i$ is derived from the raw radar detections, e.g. by a Fourier transform. Such a plurality of beam vectors constituting a raw array manifold X is shown in FIG. 3A in which a single beam vector is denoted by 31. The number of components of each beam vector corresponds to the number of real or virtual antennas comprised by the radar sensor 13.

Figure 3B:
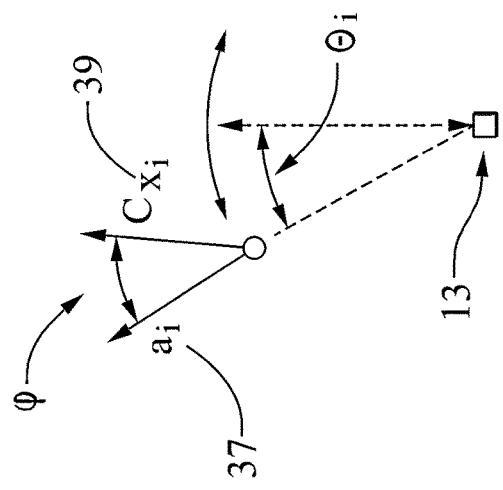

In formula (1), $A(\theta)$ represents a matrix of nominal or ideal steering or beam vectors which depend on the azimuth angle $\theta$. One of these ideal beam vectors $a_i$, 37 is shown in FIG. 3B with respect to the radar sensor 13. $\hat{Z}$ denotes a diagonal matrix which is used for normalization only.

If the raw array manifold X or plurality of beam vectors is available, a system of equations has to be solved as indicated by formula (1) in order to determine the calibration matrix C. As further suggested by the second line of formula (1), this system of equations can be solved simultaneously by a matrix inversion or a singular value decomposition (SVD), i.e. in a "least-squares' sense", and $X^+ = X^H (XX^H)^{-1}$. However, these approaches, i.e. based on matrix inversion or SVD, cannot be divided into small computational subtasks. Therefore, these approaches are not suitable for estimating the radar calibration matrix based on online calibration data.

For estimating the radar calibration matrix based on online calibration data, a so-called rank-1 update method has been developed which relies on a single beam vector $x_i$, 31 which is shown in FIG. 3A for a specific azimuth angle $\theta$.

Generally, the goal of the rank-1 update method and of the method according to the disclosure is to find an ideal calibration matrix $C_{ideal}$ which satisfies the following equation:

$$C_{ideal} x_i = \hat{z}_i a(\hat{\theta}_i) \quad (2)$$

As a prerequisite, it is assumed that an initial calibration matrix $C_0$ is available which is determined before, i.e. via a measurement in a calibration chamber at an azimuth angle $\theta$ of zero degrees. That is, such an initial calibration matrix $C_0$ includes diagonal elements only.

Based on a single beam vector $x_i$, 31, an adjustment or additive matrix $C_{add}$ 33 (see FIG. 3A) is estimated by initializing:

$$C_{old}^{(1)} = C_0 \quad (3)$$

and by calculating $C_{add}^{(i)}$ based on $x_i$ and $a_i = a(\theta_i)$ as follows:

$$p_i = C_{old}^{(i)} x_i; \quad (4)$$

$$C_{add}^{(i)} = \frac{1}{x_i^H x_i} \left( (a_i^H p_i) a_i - p_i \right) x_i^H$$

By adding the former calibration matrix $C_{old}$ (or the initial calibration matrix $C_0$, for i=1) and the adjustment matrix $C_{add}$ 33, an updated calibration matrix $C_{new}$ is obtained:

$$C_{new}^{(i)} = C_{old}^{(i)} + C_{add}^{(i)} \quad (5)$$

Thereafter, the steps described before are iterated, i.e. $C_{old}$ is updated:

$$C_{old}^{(i+1)} = C_{new}^{(i)}, \quad (6)$$

and the steps according to formulas (4) to (6) are repeated, e.g. for a predefined number of iteration steps, in order to provide a final result:

$$C = C_{new}^{(last)} \quad (7)$$

The simple rank-1 update method described by formula (4) which is based on a single beam vector $x_i$, however, does not converge properly in many cases.

In order to overcome this problem, a cumulative rank-1 update method according to the present disclosure is provided. This cumulative method relies on all available beam vectors $x_i$ (instead of a single beam vector $x_i$). That is, a plurality of beam vectors $x_i$, 31 as shown in FIG. 3A is used as an input for the method. The plurality of beam vectors 31 may be regarded as collected or reconstructed raw array manifold X. In FIG. 3A, the manifold X is depicted over the azimuth angle $\theta$. Instead of a regular grid or regular bins of the azimuth angle $\theta$ for representing the beam vectors 31 of the array manifold X, a regular grid or regular bins of an electric angle or spatial frequency u may be used, which is given as $u = \sin(\theta)$. Such a representation may facilitate the following method steps.

According to the cumulative method, all beam vectors $x_i$, 31 of the raw array manifold X are used in order to update the initial calibration matrix $C_{old}$. For each beam vector 31, a respective adjustment matrix is estimated based on one of the beam vectors $x_i$, 31, i.e. as described above according to formula (4):

$$\{x_i, a_i\} \xrightarrow{\text{yields}} C_{add,i}^{(k)} \tag{9}$$

This is shown in FIG. 3A where L adjustment matrices are depicted for each of the L beam vectors $x_i$, 31. L is the number of available beam vectors $x_i$ of the array manifold X. The L adjustment matrices $C_{add,i}$ are averaged as follows in order to obtain a correction matrix $C_{add}$:

$$C_{add}^{(k)} = \frac{1}{L} \sum C_{add,i}^{(k)} \tag{10}$$

Here, uniform averaging is applied. Alternatively, weighted averaging may also be used for the present estimation method.

In FIG. 3A, the averaged correction matrix $C_{add}$ is denoted by 35. In order to update the initial calibration matrix $C_{old}$, the averaged correction matrix $C_{add}$ from equation (10) is added to the initial or previous calibration matrix $C_{old}$ in the same additive manner as for the simple rank-1 update method described above:

$$C_{new}^{(k)} = C_{old}^{(k)} + C_{add}^{(k)} \tag{11}$$

Furthermore, the steps described above are also iterated. The cumulative method using more than one beam vector $x_i$, 31 converges as will be demonstrated below in order to achieve the desired goal:

$$\lim_{k \to \infty} \left( C_{new}^{(k)} \right) = C_{ideal} \tag{12}$$

In order to assess respective calibration results, i.e. the quality of the estimated calibration matrix, a so-called subspace angle φ is considered which is defined as the angle between an ideal or nominal beam vector $a_i$, 37 and a calibrated beam vector $Cx_i$ which is denoted by 39 (see FIG. 3B) for a specific (azimuth) angle $θ_i$. The calibrated beam vector is the product of the calibration matrix and the beam vector $x_i$, 31 for this (azimuth) angle $θ_i$. The vectors 37, 39 are depicted with respect to the radar sensor 13. The subspace angle φ is therefore determined by applying the arc cosine to the inner product of the vectors 37, 39, divided by the absolute values of the vectors 37, 39, as is known in the art (also known as measure of collinearity between vectors).

Figure 4:
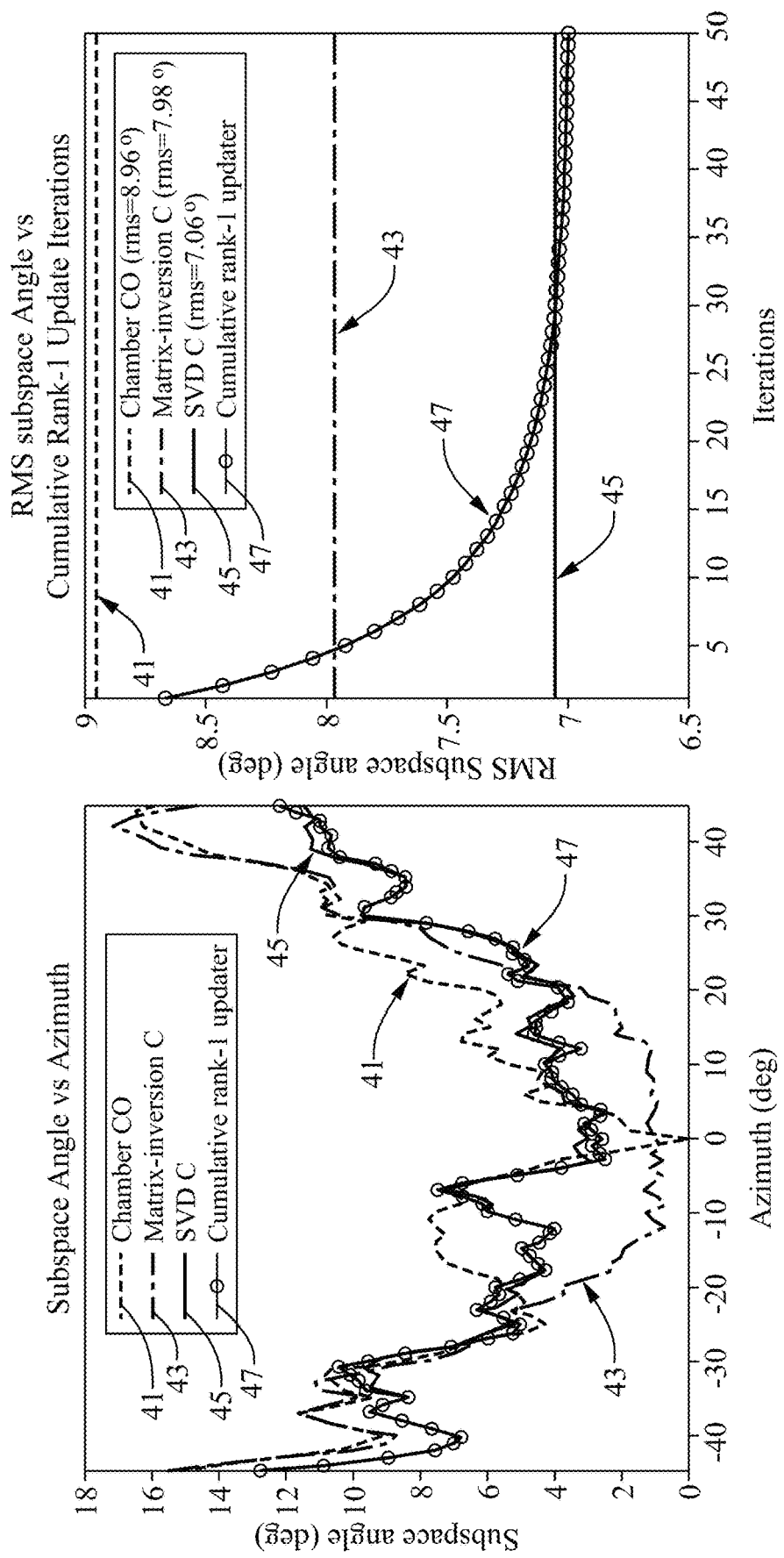
FIG. 4 shows a comparison of calculation results provided by the method according to the disclosure and by known methods, based on chamber data.
Figure 5:
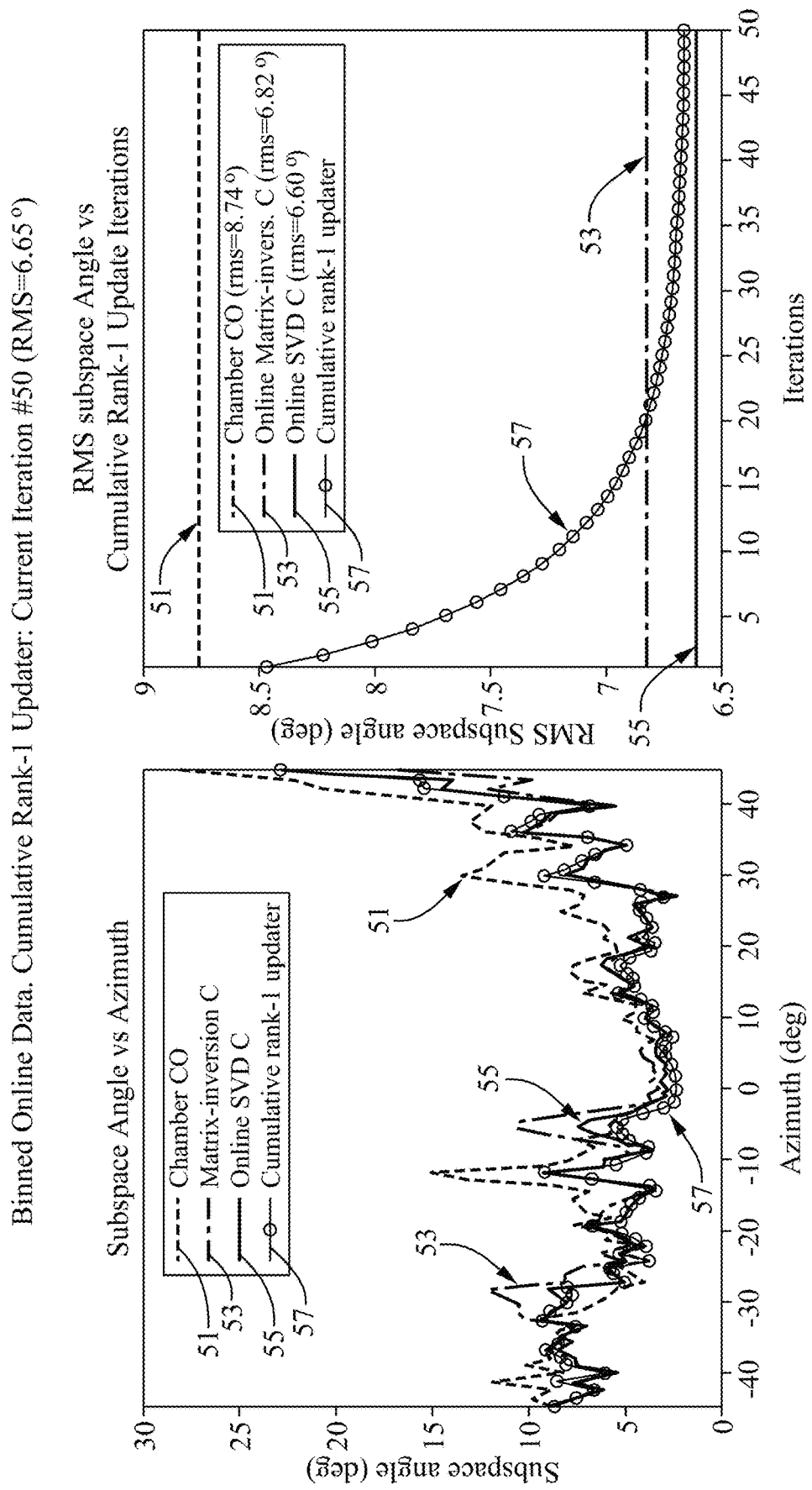
FIG. 5 shows a comparison of calibration results provided by the method according to the disclosure and by known methods, based on online data.

In FIGS. 4 and 5, the subspace angle φ in degrees is depicted in the respective left diagram over the azimuth angle in degrees for calibration matrices which have been obtained by different calibration methods. The azimuth angle covers a range from −45° to +45° such that 91 equally spaced angle bins are provided. That is, the raw array manifold X includes 91 beam vectors $x_i$, 31.

In the left diagram of FIGS. 4 and 5, the subspace angle has been determined for a calibration matrix estimated via a single chamber measurement 41, 51, via a matrix inversion-based method 43, 53, via an SVD-based method 45, 55, and via the cumulative rank-1 update method 47, 57 according to the disclosure. The single chamber measurement 41, 51 is performed at an azimuth angle of zero (θ=0) and at an elevation angle of zero such that the corresponding calibration matrix includes diagonal elements only. This calibration matrix, i.e. based on a chamber measurement at θ=0, is also used as the initial calibration matrix (i.e. $C_{old}$ in the first iteration) for the cumulative rank-1 update method 47, 57.

In the respective right diagrams of FIGS. 4 and 5, the root mean square (RMS) of the subspace angle φ is depicted over the number of iterations performed by the cumulative method according to the disclosure. Since the results when using the further calibration methods, i.e. the single chamber measurement 41, 51, the matrix inversion-based method 43, 53 and the SVD-based method 45, 55, do not change over the iterations of the cumulative rank-1 update method, the root mean square of the subspace angle provided by these methods is constant, as can be recognized in the diagrams.

For FIG. 4, raw radar detections from chamber measurements or chamber data have been used in order to determine the beam vectors $x_i$, whereas for FIG. 5, online data has been used being assigned to a respective one of the 91 angle bins. As mentioned above, the iteration starts with the initial calibration matrix from the single chamber measurement 41, 51, and the root mean square of the subspace angle reduces from one iteration to the next one, i.e. from the initial value of 8.96 degrees to a final value of 7.01 degrees after 50 iterations (FIG. 4), and from 8.74 degrees to a final value of 6.65 degrees after 50 iterations.

This demonstrates that the calibration accuracy of the cumulative method according to the disclosure is comparable or even better than the accuracy of the calibration matrices provided by the SVD-based method, and better in all cases than the accuracy of the calibration matrices provided by the matrix inversion-based method. This can also be recognized by the diagram on the respective left side of FIGS. 4 and 5. The curves for the subspace angle are very close to each other for the calibration matrix provided by the SVD-based method 45, 55 and by the cumulative method after 50 iterations 47, 57, whereas the curves for the subspace angle show a much larger deviation for the calibration matrix provided by the single chamber measurement 41, 51 and by matrix inversion-based method 43, 53. However, the cumulative method offers computational advantages over the matrix inversion and SVD operations (as described above). A summary of the results for the root mean square of the subspace angle and for the azimuth error is provided in table 1 below.

Figure 6A:
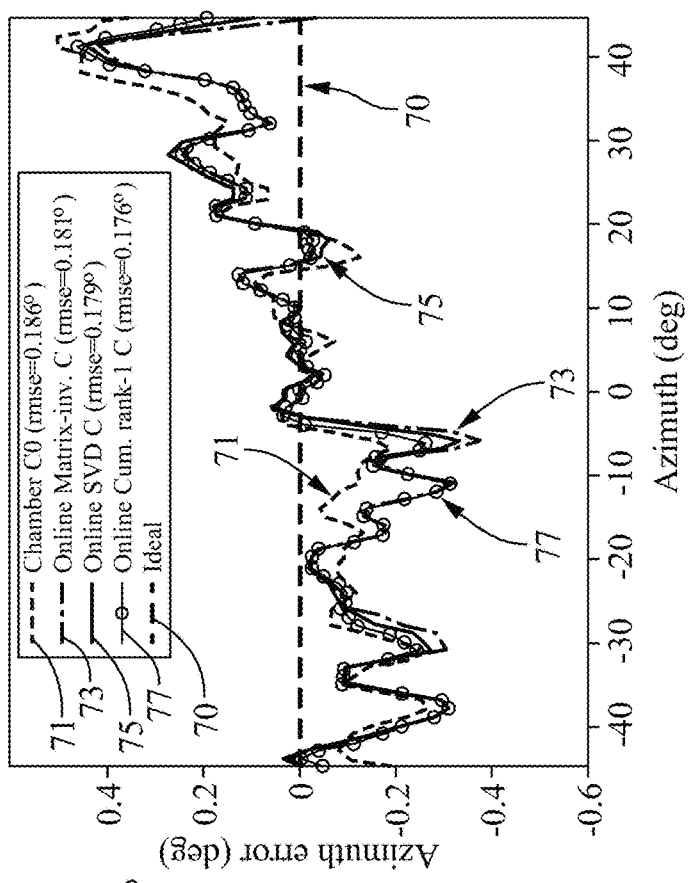
FIGS. 6A and 6B show a comparison of an estimated azimuth error when applying the calibration results to an angle finding procedure.
Figure 6B:
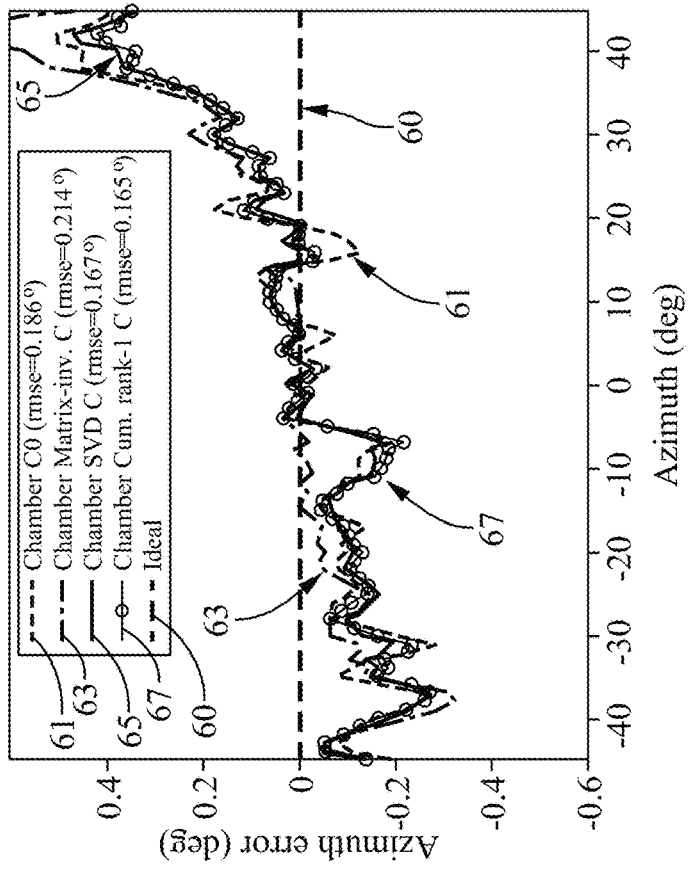

The respective calibration matrices for which the subspace angle and its root mean square are shown in FIGS. 4 and 5, respectively, have also been applied to angle finding in order to check the performance of the respective calibration matrix. In FIGS. 6A and 6B, the estimated azimuth error of such an angle finding procedure is plotted over the azimuth angle in degrees for applying the different calibration matrices.

For the left diagram, these calibration matrices are estimated based on chamber data as for the results shown in FIG. 4, whereas for the right diagram, the respective calibration matrices have been estimated based on online calibration data as for FIG. 5. The result for the ideal calibration matrix providing an azimuth error of zero is also shown and denoted by 60 and 70, respectively. Furthermore, the estimated azimuth error for the angle finding is shown for applying the respective calibration matrix estimated based on a single chamber measurement 61, 71, based on chamber measurements and matrix inversion 63, based on online data and matrix inversion 73, based on chamber data and SVD 65, based on online data and SVD 75, based on chamber data and the cumulative method 67, and based on online data and the cumulative method 77.

As can be recognized, the cumulative method according to the disclosure provides quite a small azimuth error when the resulting calibration matrix is applied to angle finding, i.e. in a range comparable to the SVD-method or even slightly smaller, whereas applying the respective calibration matrix based on matrix inversion and based on the single chamber measurement at zero degrees provide a larger azimuth error. Hence, the calibration accuracy can generally be improved by the cumulative method according to the disclosure.

The results for the respective root mean square of the subspace angle (see FIGS. 4 and 5) and for the estimated azimuth error are summarized in table 1 below, i.e. in the lines for the angle range from −45 degrees to +45 degrees. In addition, further results are shown which are based on chamber data for an angle range from −60 degrees to +60 degrees. These additional results also show a lower root mean square of the subspace angle and a lower estimated azimuth error for the cumulative method according to the disclosure in comparison to all further methods, even in comparison to the SVD-method.

TABLE 1

| Data for estimation of cal. Matrix C | Evaluated quantity | Chamber at θ = 0 | Matrix inversion | SVD | Cumulative rank-1 |
|---|---|---|---|---|---|
| Chamber data, −60° to +60° | RMS sub angle | 12.01° | 12.27° | 10.05° | 9.16° |
|  | Azimuth error | — | 0.273° | 0.225° | 0.197° |
| Chamber data, −45° to +45° | RMS sub angle | 8.96° | 7.98° | 7.06° | 7.01° |
|  | Azimuth error | 0.186° | 0.214° | 0.167° | 0.165° |
| Online binned data, −45° to +45° | RMS sub angle | 8.74° | 6.82° | 6.60° | 6.65° |
|  | Azimuth error | 0.186° | 0.181° | 0.179° | 0.176° |

Figure 7:
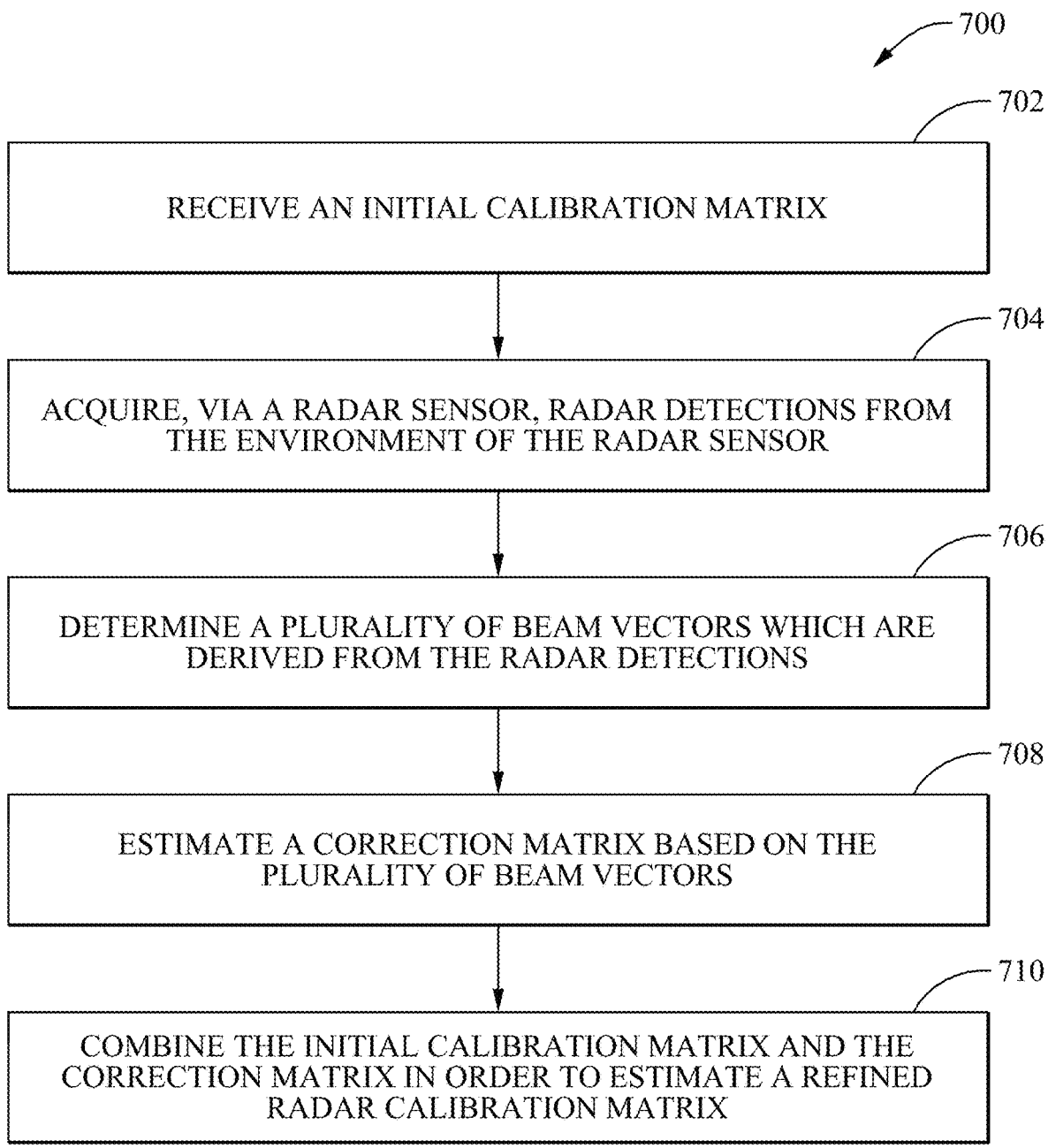
FIG. 7 shows a flow diagram illustrating a method for estimating a radar calibration matrix according to various embodiments.

FIG. 7 shows a flow diagram 700 illustrating a method for estimating a radar calibration matrix according to various embodiments. At 702, an initial calibration matrix may be received. At 704, radar detections may be acquired, via a radar sensor, from the external environment of the radar sensor. At 706, a plurality of beam vectors may be determined which may be derived from the radar detections. At 708, a correction matrix may be estimated based on the plurality of beam vectors. At 710, the initial calibration matrix and the correction matrix may be combined in order to estimate a refined radar calibration matrix which is utilized as calibration matrix when applying the radar sensor.

According to various embodiments, it may be determined for each of the plurality of radar detections whether the respective radar detection is related to a single scattering center.

According to various embodiments, a respective adjustment matrix may be estimated based on one of the beam vectors, and the correction matrix may be estimated by calculating an average over the adjustment matrices of the beam vectors.

According to various embodiments, a subset of the available beam vectors may be selected for calculating the average such that the selected beam vectors are linearly independent.

According to various embodiments, a number of the beam vectors in the subset may be equal to or greater than a number of antenna receive elements of the radar sensor.

According to various embodiments, the plurality of beam vectors may cover a predetermined range of (azimuth) angles with respect to the radar sensor.

According to various embodiments, a grid of equidistant nodes may be defined for an electric angle which is related to the azimuth angle, and each of the plurality of beam vectors may be assigned to one of the equidistant nodes of the grid for the electric angle.

According to various embodiments, the respective azimuth angle may be determined for each of the beam vectors based on a range rate which is estimated from the (stationary) radar detections.

According to various embodiments, the steps of estimating a correction matrix and of combining the initial calibration matrix and the correction matrix may be performed iteratively until a deviation between the refined calibration matrix and a previous refined calibration matrix being estimated in an immediately preceding iteration step is smaller than a predefined value.

According to various embodiments, the initial calibration matrix may be determined via a (single) measurement, e.g. in a calibration chamber and/or at an azimuth angle of zero degrees and at an elevation angle of zero degrees.

According to various embodiments, a range may be determined with respect to the radar sensor for each of the plurality of radar detections, and each of the plurality of radar detections may be used for determining the plurality of beam vectors only if the range of this detection is greater than a predetermined range.

According to various embodiments, it may be determined for each of the plurality of radar detections whether the respective radar detection is related to a single scattering center, and radar detections may be disregarded for which it is determined that they are not related to a single scattering center. Each of the steps 702, 704, 706, 708, 710 and the further steps described above may be performed by computer hardware components.

Figure 8:
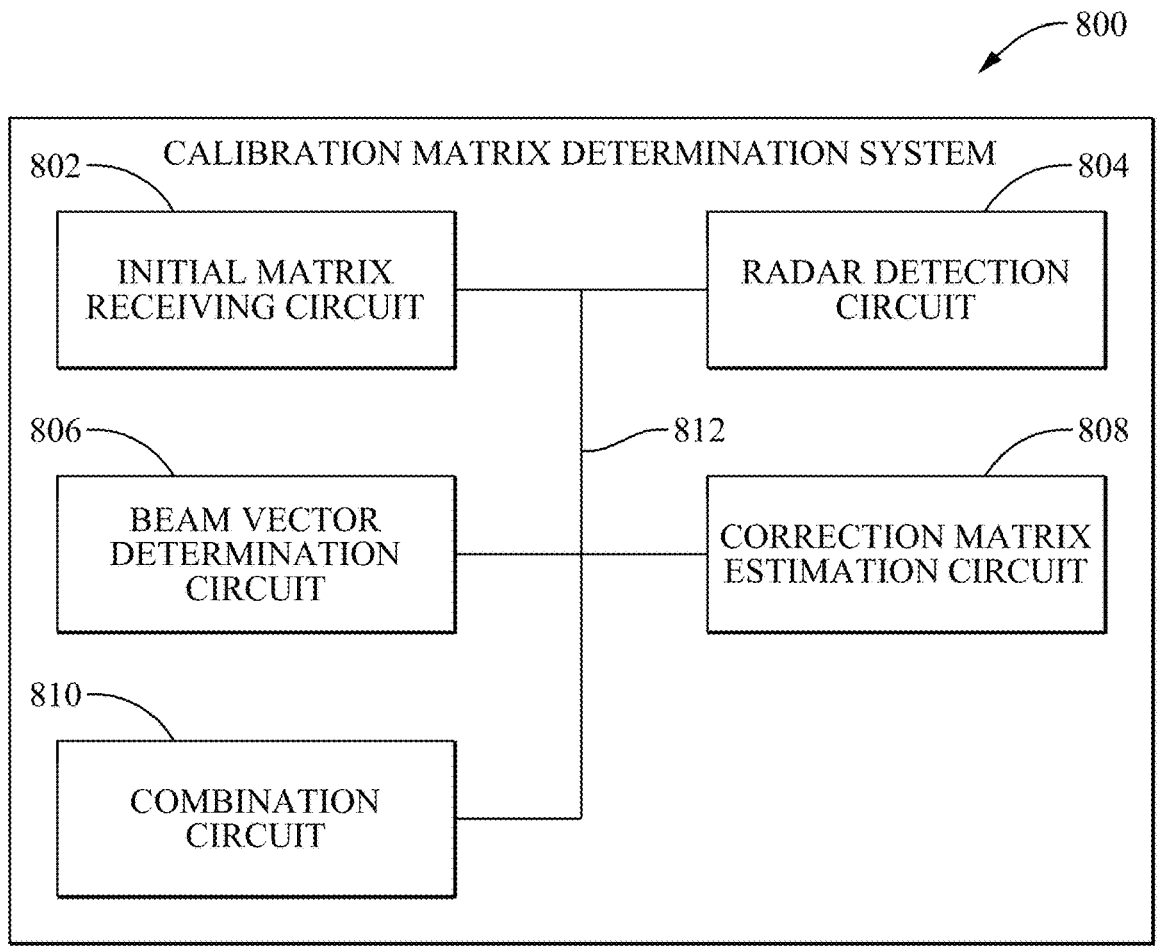
FIG. 8 shows a calibration matrix estimation system according to various embodiments.

FIG. 8 shows a calibration matrix estimation system 800 according to various embodiments. The system 800 may implemented in the processing unit 15 (see FIG. 1) and may be provided for calibrating a radar sensor. The system 800 may include an initial matrix receiving circuit 802, a radar detection circuit 804, a beam vector determination circuit 806, a correction matrix estimation circuit 808, and a combination circuit 810.

The initial matrix receiving circuit 802 may be configured to receive an initial calibration matrix. The radar detection circuit 804 may be configured to acquire, via a radar sensor, from the environment of the radar sensor. The beam vector determination circuit 806 may be configured to determine a plurality of beam vectors which may be derived from the radar detections. The correction matrix estimation circuit 808 may be configured to estimate a correction matrix based on the plurality of beam vectors. The combination circuit 810 may be configured to combine the initial calibration matrix and the correction matrix in order to estimate a refined radar calibration matrix.

The initial matrix receiving circuit 802, the radar detection circuit 804, the beam vector determination circuit 806, the correction matrix estimation circuit 808, and the combination circuit 810 may be coupled with each other, e.g. via an electrical connection 812, such as e.g. a cable or a computer bus or via any other suitable electrical connection to exchange electrical signals.

A "circuit" may be understood as any kind of a logic implementing entity, which may be special purpose circuitry or a processor executing a program stored in a memory, firmware, or any combination thereof.

Figure 9:
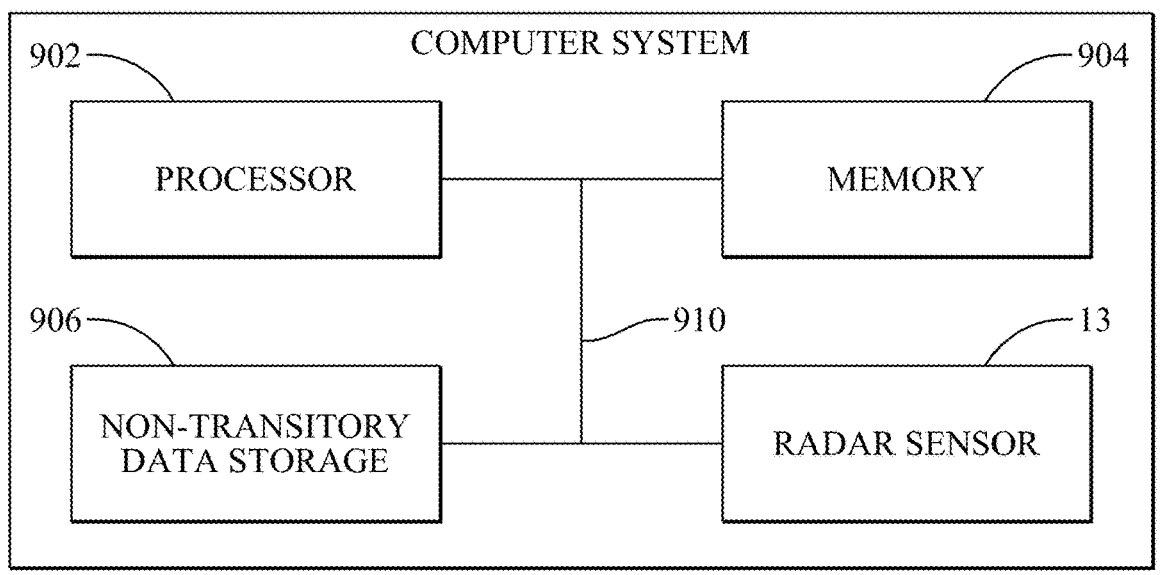
FIG. 9 shows a computer system with a plurality of computer hardware components configured to carry out steps of a computer implemented method for estimating a radar calibration matrix according to various embodiments.

FIG. 9 depicts a computer system 900 with a plurality of computer hardware components configured to carry out steps of a computer implemented method for estimating a radar calibration matrix according to various embodiments. The computer system 900 correspond to the computer system 11 as shown in FIG. 1 and may include a processor 902, a memory 904, and a non-transitory data storage 906. The radar sensor 13 (see FIG. 1) may be provided as part of the computer system 900 (like illustrated in FIG. 9), or may be provided external to the computer system 900. The processor 902, the memory 904 and the non-transitory data storage 906 may be components of the processing unit 15 (see FIG. 1).

The processor 902 may carry out instructions provided in the memory 904. The non-transitory data storage 906 may store a computer program, including the instructions that may be transferred to the memory 804 and then executed by the processor 902. The radar sensor 13 may be used for acquiring radar sensor data, based on which a range rate may be acquired.

The processor 902, the memory 904, and the non-transitory data storage 906 may be coupled with each other, e.g. via an electrical connection 910, such as e.g. a cable or a computer bus or via any other suitable electrical connection to exchange electrical signals. The radar sensor 13 may be coupled to the computer system 900, for example via an external interface, or may be provided as parts of the computer system (in other words: internal to the computer system, for example coupled via the electrical connection 910).

The terms "coupling" or "connection" are intended to include a direct "coupling" (for example via a physical link) or direct "connection" as well as an indirect "coupling" or indirect "connection" (for example via a logical link), respectively.

It will be understood that what has been described for one of the methods above may analogously hold true for the system 800 and/or for the computer system 900.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

LIST OF REFERENCE CHARACTERS FOR THE ELEMENTS IN THE DRAWINGS

The following is a list of the certain items in the drawings, in numerical order. Items not listed in the list may nonetheless be part of a given embodiment. For better legibility of the text, a given reference character may be recited near some, but not all, recitations of the referenced item in the text. The same reference number may be used with reference to different examples or different instances of a given item.

10 vehicle
11 computer system
13 radar sensor
15 processing unit
17 boresight direction
19 instrumental field of view
21 moving target object
23 stationary target object
25 calibration object
27 arrow
29 arrow
31 beam vector
33 adjustment matrix
35 correction matrix
37 ideal beam vector
39 calibrated beam vector $Cx_i$
41 subspace angle and RMS for calibration matrix from chamber measurement, chamber data
43 subspace angle and RMS for calibration matrix from matrix inversion, chamber data
45 subspace angle and RMS for calibration matrix from SVD, chamber data
47 subspace angle and RMS for calibration matrix from cumulative method, chamber data
51 subspace angle and RMS for calibration matrix from chamber measurement, online data
53 subspace angle and RMS for calibration matrix from matrix inversion, online data
55 subspace angle and RMS for calibration matrix from SVD, online data
57 subspace angle and RMS for calibration matrix from cumulative method, online data
60 azimuth error for ideal calibration matrix
61 azimuth error for calibration matrix from chamber measurement, chamber data
63 azimuth error for calibration matrix from matrix inversion, chamber data
65 azimuth error for calibration matrix from SVD, chamber data
67 azimuth error for calibration matrix from cumulative method, chamber data
70 azimuth error for ideal calibration matrix
71 azimuth error for calibration matrix from chamber measurement, online data
73 azimuth error for calibration matrix from matrix inversion, online data
75 azimuth error for calibration matrix from SVD, online data
77 azimuth error for calibration matrix from cumulative method, online data
700 flow diagram illustrating a method for estimating a radar calibration matrix
702 step of receiving an initial calibration matrix
704 step of acquiring, via a radar sensor, radar detections from the external environment of the radar sensor
706 step of determining a plurality of beam vectors which are derived from the radar detections
708 step of estimating a correction matrix based on the plurality of beam vectors
710 step of combining the initial calibration matrix and the correction matrix in order to estimate a refined radar calibration matrix
800 calibration matrix determination system
802 initial matrix receiving circuit
804 radar detection circuit 806 beam vector determination circuit
808 correction matrix estimation circuit
810 combination circuit
812 connection
900 computer system according to various embodiments
902 processor
904 memory
906 non-transitory data storage
910 connection

What is claimed is:

1. A computer implemented method for estimating a radar calibration matrix, the method comprising:
receiving an initial calibration matrix;
acquiring, from a radar sensor, radar detections from an external environment of the radar sensor;
determining a plurality of beam vectors which are derived from the radar detections by a Fourier transform;
estimating a correction matrix based on the plurality of beam vectors; and
combining the initial calibration matrix and the correction matrix in order to estimate a refined radar calibration matrix which is utilized as a calibration matrix when applying the radar sensor;
wherein:
for each of the beam vectors, a respective adjustment matrix is estimated based on the respective beam vector;
the correction matrix is estimated by calculating an average over the adjustment matrices of the beam vectors;
the plurality of beam vectors covers a predetermined range of azimuth angles with respect to the radar sensor;
a grid of equidistant nodes is defined for an electric angle which is related to the azimuth angle; and
each of the plurality of beam vectors is assigned to one of the equidistant nodes of the grid for the electric angle.

2. The computer implemented method according to claim 1, further comprising:
selecting a subset of available beam vectors, wherein the selected beam vectors are linearly independent.

3. The computer implemented method according to claim 2, wherein a number of the beam vectors in the subset is equal to or greater than a number of antenna array elements of the radar sensor.

4. The computer implemented method according to claim 1, wherein a respective azimuth angle is determined for each of the beam vectors based on a range rate that is estimated from the radar detections.

5. The computer implemented method according to claim 1, wherein the steps of estimating the correction matrix and of combining the initial calibration matrix and the correction matrix are performed iteratively until a deviation between the refined radar calibration matrix and a previous refined radar calibration matrix being estimated in an immediately preceding iteration step is smaller than a predefined value.

6. The computer implemented method according claim 1, further comprising:
determining the initial calibration matrix via a measurement in a calibration chamber at an azimuth angle of zero degrees and at an elevation angle of zero degrees.

7. The computer implemented method according to claim 1, further comprising:
determining a range with respect to the radar sensor for each of the radar detections; and
using the radar detections for determining the plurality of beam vectors based on whether the determined range with respect to the radar sensor is greater than a predetermined range.

8. The computer implemented method according to claim 1, further comprising:
determining, for each of the radar detections, whether a respective radar detection is related to a single scattering center, and
disregarding radar detections that are determined not related to the single scattering center.

9. A system comprising:
a plurality of computer hardware components including a processor; and
a non-transitory computer readable medium comprising instructions, which when executed by the processor, cause the processor to:
receive an initial calibration matrix;
receive a plurality of radar detections about an external environment of a radar sensor;
determine a plurality of beam vectors which are derived from the radar detections by a Fourier transform;
estimate a correction matrix based on the plurality of beam vectors; and
combine the initial calibration matrix and the correction matrix in order to estimate a refined radar calibration matrix which is utilized as a calibration matrix when applying the radar sensor;
wherein:
for each of the beam vectors, a respective adjustment matrix is estimated based on the respective beam vector;
the correction matrix is estimated by calculating an average over the adjustment matrices of the beam vectors;
the plurality of beam vectors covers a predetermined range of azimuth angles with respect to the radar sensor;
a grid of equidistant nodes is defined for an electric angle which is related to the azimuth angle; and
each of the plurality of beam vectors is assigned to one of the equidistant nodes of the grid for the electric angle.

10. The system according to claim 9, further comprising:
the radar sensor configured to acquire the plurality of radar detections.

11. The system according to claim 10, wherein the non-transitory computer readable medium further comprises instructions, which when executed by the processor, cause the processor to:
utilize the refined radar calibration matrix when applying the radar sensor.

12. A vehicle comprising:
a radar sensor;
a processor;
a non-transitory data computer readable medium comprising instructions, which when executed by the processor, cause the processor to:
receive an initial calibration matrix;
acquire, via the radar sensor, a plurality of radar detections about an external environment of the radar sensor;
determine a plurality of beam vectors which are derived from the radar detections by a Fourier transform;
estimate a correction matrix based on the plurality of beam vectors; and
combine the initial calibration matrix and the correction matrix in order to estimate a refined radar calibration matrix which is utilized as a calibration matrix when applying the radar sensor;

wherein:

for each of the beam vectors, a respective adjustment matrix is estimated based on the respective beam vector;

the correction matrix is estimated by calculating an average over the adjustment matrices of the beam vectors;

the plurality of beam vectors covers a predetermined range of azimuth angles with respect to the radar sensor;

a grid of equidistant nodes is defined for an electric angle which is related to the azimuth angle; and each of the plurality of beam vectors is assigned to one of the equidistant nodes of the grid for the electric angle.

13. The vehicle according to claim 12, wherein the non-transitory computer readable medium further comprises instructions, which when executed by the processor, cause the processor to:

determine a range with respect to the radar sensor for each of the plurality of radar detections; and use each of the plurality of radar detections to determine the plurality of beam vectors based on whether the determined range with respect to the radar sensor is greater than a predetermined range.

14. The vehicle according to claim 12, wherein the non-transitory computer readable medium further comprises instructions, which when executed by the processor, cause the processor to:

determine, for each of the plurality of radar detections, whether the respective radar detection is related to a single scattering center, and disregard radar detections that are determined not related to the single scattering center.

\* \* \* \* \*